United States Patent [19]
Whipps

[11] 3,967,499
[45] July 6, 1976

[54] MEASURING RATE-OF-TURN ON BOARD OF SHIPS

[75] Inventor: Sydney L. Whipps, Doddinghurst, England

[73] Assignee: Shell Oil Company, Houston, Tex.

[22] Filed: June 26, 1975

[21] Appl. No.: 590,790

[30] Foreign Application Priority Data
July 19, 1974 United Kingdom............... 32094/74

[52] U.S. Cl................................................ 73/178 R
[51] Int. Cl.². .................................... G01C 21/00
[58] Field of Search ............... 73/178 R; 114/144 E; 244/77 E, 77 B

[56] References Cited
UNITED STATES PATENTS
| 1,765,583 | 6/1930 | Henderson | 114/144 E |
| 3,133,520 | 5/1964 | Bentkowsky | 73/178 R |
| 3,886,884 | 6/1975 | Stark et al. | 244/77 E |

*Primary Examiner*—Donald O. Woodiel

[57] ABSTRACT

A method and apparatus for measuring and displaying the rate-of-turn of a large ship while substantially eliminating response to rolling and pitching motions of the ship.

9 Claims, 11 Drawing Figures

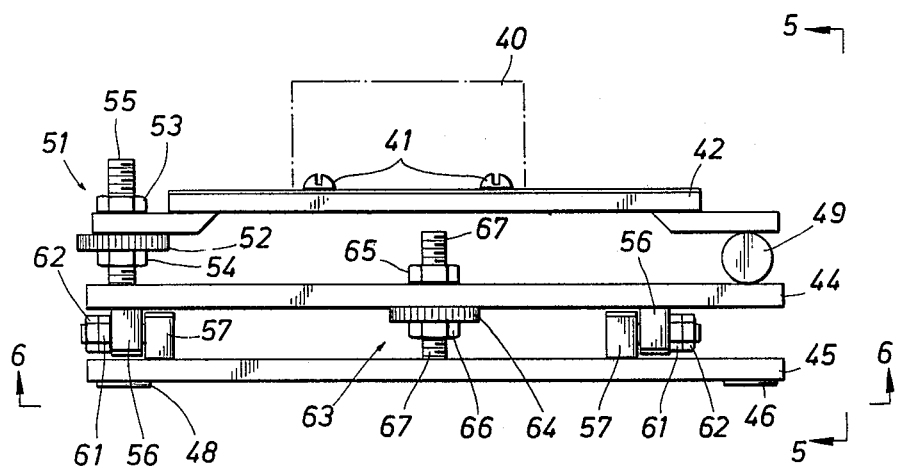
FIG. 4
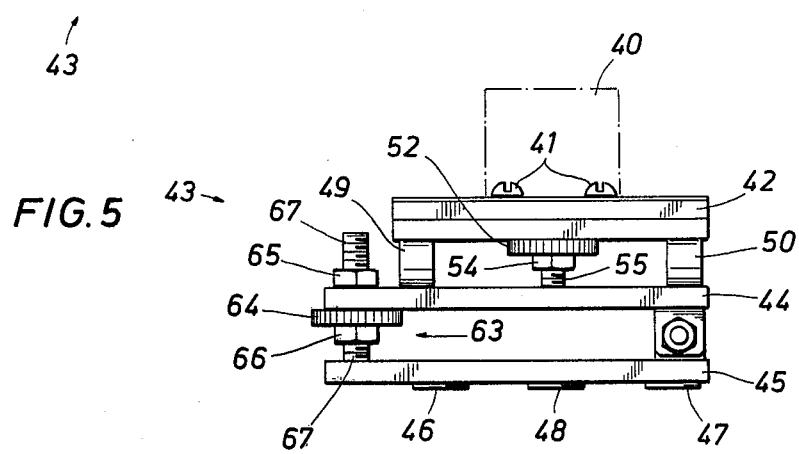
FIG. 5
FIG. 6
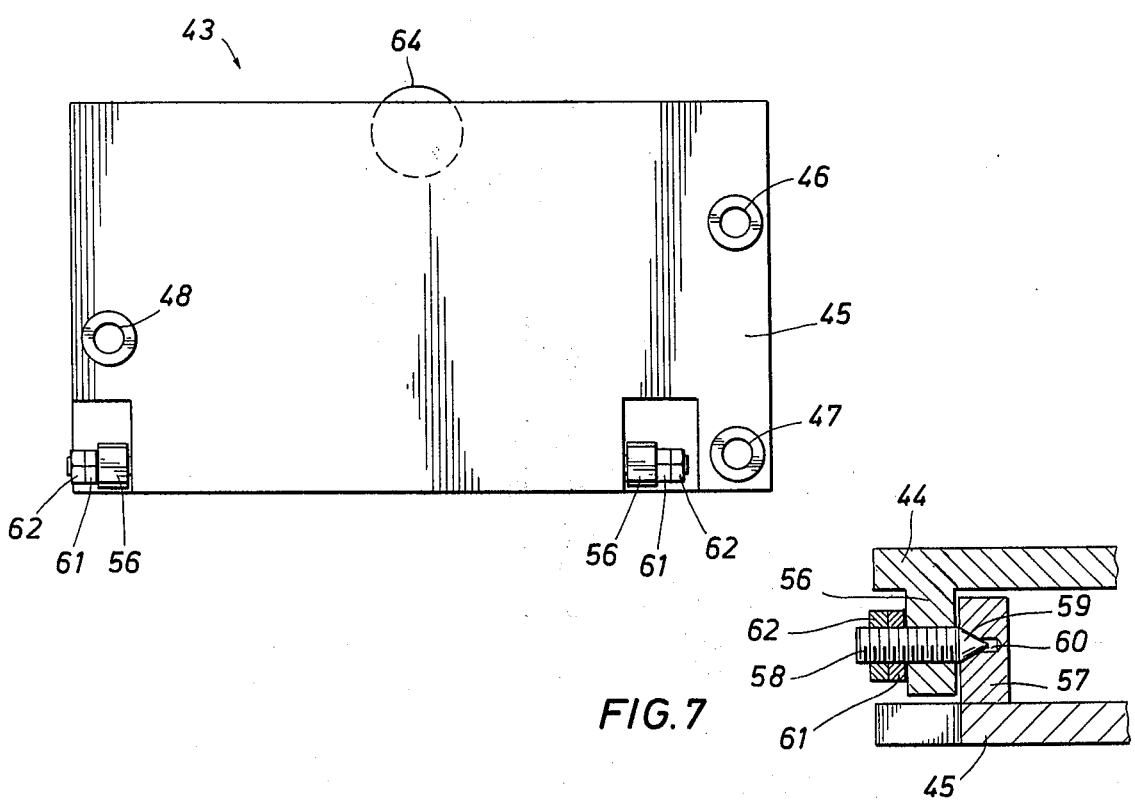
FIG. 7

MEASURING RATE-OF-TURN ON BOARD OF SHIPS

BACKGROUND OF THE INVENTION

The present invention relates to an arrangement and a method for measuring the rate-of-turn of a ship by means of a rate-of-turn sensor.

A ship has three degrees of rotational freedom, namely roll, pitch and turn. In service, a ship, and therefore a shipborne rate-of-turn sensor, is subjected to all three motions, either independently or simultaneously. The rate-of-turn sensor should primarily respond to turn motions and should be insensitive to roll and pitch motions.

Rate-of-turn sensors, such as the gyro rate sensor or the vibrating wire sensor, are known and respond primarily to motions about one axis. Employing rate-of-turn instrumentation on Very Large Crude Carriers (V.L.C.C.'s) to assist in berthing maneuvers and during manual steering has, however, been found to be impossible as the information displayed was meaningless.

It was then suggested to support a rate-of-turn sensor onboard ship by a stabilized platform, i.e., a platform which is automatically and continuously maintained in a horizontal position, notwithstanding the movements of the structure of the ship, for example the bridge of the ship, so as to measure the Azimuth rate-of-turn.

Notwithstanding the application of such expensive stabilized platform, it was found that the information displayed was still meaningless, for the equipment proved to be sensitive to outputs related to roll and pitch motions of the ship.

BRIEF SUMMARY OF THE INVENTION

It is an object of the present invention to provide a method and an arrangement for measuring the rate-of-turn of a ship which measurement has a neglectable response to rolling and pitching motions of the ship and displays accurate rate-of-turn information under a variety of circumstances.

The invention therefore provides a method for measuring and displaying the rate-of-turn of a ship, which method comprises the following steps:
 a. aligning a rate-of-turn sensor with its responsive axis parallel to the vertical axis of the ship;
 b. fixedly securing the sensor in its aligned position;
 c. having the sensor to generate a signal representative of rate of movements of the ship about the vertical axis of the ship, and
 d. feeding said signal to a display.

Further, according to the present invention, there is provided an arrangement for measuring the rate-of-turn of a ship, comprising a rate-of-turn sensor generating a signal representative of the rate-of-turn of the ship, a rate-of-turn display and means for feeding the signal from the sensor to the display, in which the rate-of-turn sensor is adapted to be placed in a fixed position relative to the ship structure.

It was found that during berthing maneuvers, harbor approaches, and manual straight-course steering, ships seldom turn at rates in excess of 9°/minute (0.15°/sec.). Consequently, the resolution of the indicator should be such that a fraction of this maximum can be easily interpreted by an operator. Also, it was established that the maximum rate-of-turn likely to occur under any circumstances is in the order of 36°/min. Consequently, the display will, preferably, be designed to accommodate such extreme rates-of-turn. This may be achieved by non-linearization of the meter scaling or expanded scale techniques, such as a strip speed display and the like.

Misalignment of the sensor will cause erroneous outputs, for example about 12°/minute, i.e., many times the meaningful output of the display, which may be 1°/min. in berthing maneuvers or 3°/min. in harbor approach maneuvers.

The arrangement according to the invention may therefore further comprise a support for the rate-of-turn sensor, which is adapted to be fixedly attached to the ship and which allows an adjustment of the plane in which the rate-of-turn sensor will be finally positioned.

The majority of rate sensors respond implicitly to input signals within the frequency range zero to 60 Hertz. Fortunately in this application, the effective frequency response is considerably reduced by the limited response of output display meters. These are normally for use on board ships of pivotless moving coil design having a torsion wire suspension system. The damped natural frequency of such instruments may be in the order of 1.0 Hertz.

The degree of system damping required to give optimum performance is impossible to predict with certainty. Factors, such as the amplitude and frequency of the "noise" content of any signal significantly affect the degree of damping required. However, in the role for which a rate-of-turn meter is intended there is no advantage to be gained by displaying data which vary faster than correction can be applied. Consequently, additional damping to that inherent to the meter may improve the legibility of the displayed information.

The arrangement according to the present invention therefore preferably comprises signal damping means with an adjustable time constant and more preferably means wherein the time constant may be varied from 0 second to 40 seconds.

Preferably, the rate-of-turn sensor in the arrangement according to the present invention includes a tuning fork together with means for maintaining the fork in vibration and means for detecting and measuring torsional oscillations set-up in the stem of the fork, which oscillations are a measure of the rate-of-turn of the ship.

This type of rate-of-turn sensor has been found to be of particular advantage for employment onboard ships in view of its long undisturbed service life as the mechanical parts hardly suffer from wear. Further, it has been discovered that the datum stability of this type of sensor is excellent so that the accuracy of the arrangement for measuring rate-of-turn of a ship at the start of its voyage is maintained within the narrow limits set, during its voyage as well as during the berthing maneuver at the end of the voyage, which can be more than 30 days later. This, of course, is of utmost importance as the ship personnel must be continuously able to rely on the equipment.

BRIEF DESCRIPTION OF THE DRAWINGS

The invention will be further explained with reference to the accompanying drawings, in which:

FIG. 4 is a front view of a support for a rate sensor according to the invention.

FIG. 5 is an end view of the support.

FIG. 6 is a bottom view of the support.

FIG. 7 shows a detail of the support of FIG. 4.

PREFERRED EMBODIMENT

Figure 1:
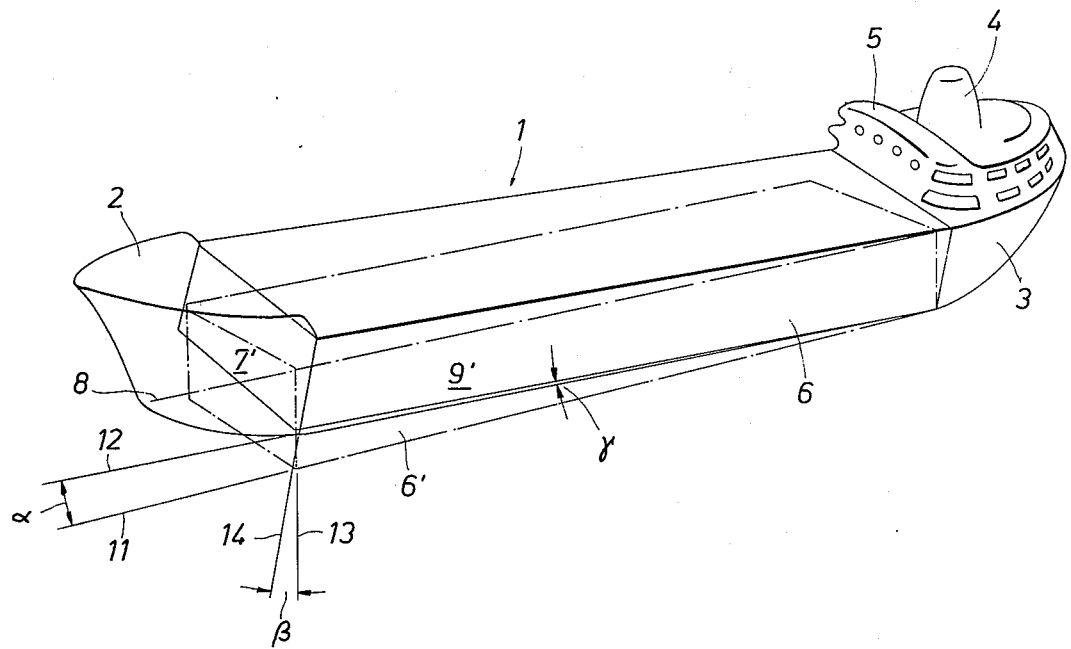
FIG. 1 is a view in perspective of a ship undergoing roll and pitch movements.

The ship 1 in FIG. 1 is undergoing roll and pitch movements. Reference number 2 indicates the bow of the ship; 3 the stern; 4 the stack and 5 the bridge. The midship part 6 has also been drawn (dash-dot line) in the horizontal position 6', thus clarifying the actual position of the ship 1.

The roll movement of the ship, by definition, is the movement about the fore-and-aft axis 8. The pitch movement, by definition, is the movement about the port-starboard axis (not shown), which is perpendicular to the axis 8.

As a consequence of roll alone the plane 7' will turn about the axis 8, while pitch alone will cause plane 9' to turn about the portstarboard axis.

Consequently, in the situation depicted in FIG. 1 the pitch angle alpha will be the angle between the horizontal line 11 and the line 12 of the ship. The roll angle beta will be the angle between the vertical line 13 and the line 14 of the ship.

The heading of the ship 1 will be determined by the fore-and-aft axis 8. Therefore, roll alone will not affect the heading of the vessel, however if the ship undergoes pitch movement after roll movement, or if both movements coincide then the heading of the ship will change in proportion to the pitch and roll angle.

A horizontally stabilized rate-of-turn sensor would respond to the true Azimuth rate-of-turn in this situation. However, it would be wrong to conclude that response from the helmsman is desirable.

The purpose of a rate-of-turn indicator is to inform a helmsman or master of rates-of-turn over which the helm has some control. The situation considered is transitional and requires no rudder correction.

Contrary to general expectation it can be shown that a rate sensor which is rigidly attached to a vessel has minimum response to rolling and pitching motions.

FIG. 2 shows again the ship 1 from FIG. 1, in which the same parts are referred to with the same reference numbers. Moreover, in this figure the fore-and-aft axis 8 has been denominated the Z-axis, while the port-starboard axis has been indicated as the X-axis, and the vertical ship axis is the Y-axis. A rate sensor 20 has been fixedly attached to a ship with its axis ($x$; $y$ and $z$) aligned with the axis of the ship. As the rate sensor will practically only respond to movements about one axis, in this example y-axis, it will respond only to movements of the ship about its Y-axis.

Rotation of a ship about the Y-axis is controlled by helm action irrespective of the attitude of the ship. A fixedly mounted rate sensor will therefore record only rates-of-turn which occur in a plane in which helm action has control.

Rolling and pitching movements, over which helm action has little control are, by definition, rotational movements about the X- and Z-axes of a ship. Through proper alignment of a rate-of-turn sensor, movements about these axes remain coincident with the practically insensitive $x$ and $z$ axes of the sensor at all times.

Rate-of-turn sensors are designed to respond to movements about one axis only, but due to material and manufacturing inperfections, all respond - albeit to a lesser degree - to movements about the two remaining axes. Or in other words, they respond in practice slightly to movements about the above-mentioned $x$- and $z$-axes. This phenomenon is termed cross-axis sensitivity.

Care is taken during manufacture to ensure that cross-axis sensitivity is minimal. To retain this essential quality it is equally essential that the alignment of a sensor within a complete instrument is precise. Also, that the alignment of the instrument with the vessel is equally precise. Failure in this respect results in the effective cross-axis sensitivity being much higher than the figures quoted for basic sensors.

The importance of alignment may be emphasized by the following example:

Cross-axis sensitivity of sensor : 1%
Axial misalignment in the pitch
plane due to poor installation : 3 degrees
Roll angle of ship : 5 degrees (peak)
Roll period : 10 seconds
Assuming simple harmonic motion :
Roll angle displacement: $\phi = 5° \sin.\omega t$ Roll angle velocity : $\dot{\phi} = \frac{d}{dt} 5° \sin.\omega t = \omega . 5° \cos . \omega t$ Therefore: $-\dot{\phi}max$. (maximum rate of roll) $= \omega.5°/\text{second}$.

Erroneous output = Effective cross-coupling × rate of roll, but
Effective cross-coupling = 0.01 + sin. 3°, therefore:
Erroneous
output (peak): $-\theta = \omega.5.(0.01 + \sin. 3°) \text{ deg/sec}$.

$$= \frac{2 . \pi . 5}{10}(0.01 + 0.052) . 60 . \text{deg/min}.$$

Therefore, $\theta = 11.7°/\text{minute (peak)}$.

It will be seen from this example that misalignment of the transducer has effectively degraded the cross-axis sensitivity of the high quality transducer by a factor of more than 6.

The effect of axial misalignment in the roll plane is deliberately omitted in the foregoing calculations. Its effect is similar to that of pitch axis misalignment. The rules of superposition apply when calculating the combined effects of pitch and roll motions.

Figure 2:
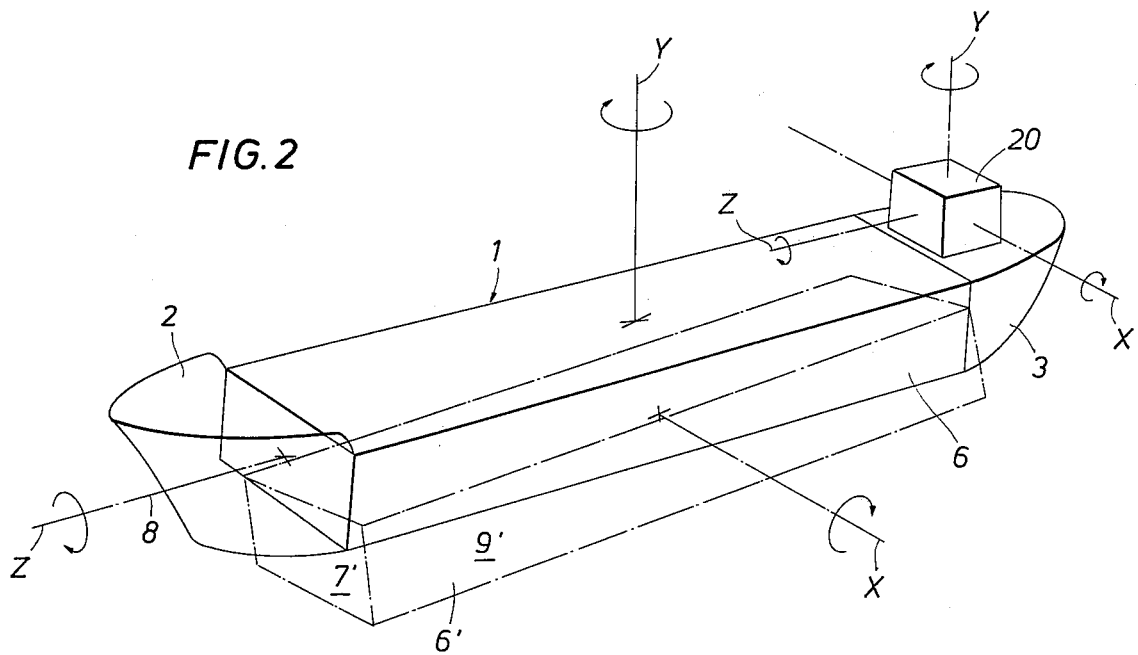
FIG. 2 is a view in perspective of a ship with a rate-of-turn sensor according to the present invention.
Figure 3:
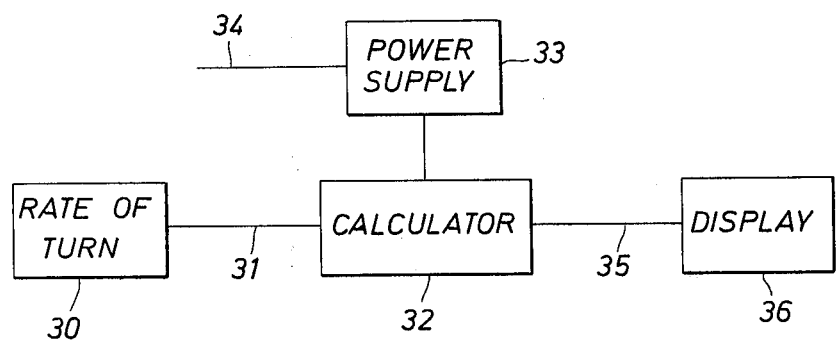
FIG. 3 is a block diagram of an arrangement according to the invention.

The arrangement according to the invention is shown in the block diagram of FIG. 3, wherein 30 refers to a rate-of-turn sensor which is placed in a fixed position relative to the structure, such as the deck, of the ship (see FIG. 2). The signal generated by the sensor 30 is led through line 31 to the main electronics unit 32, which normally is located in the proximity of the sensor 30, which may be located on the bridge of the ship, such as the computer room, chart room or any other convenient room. The main electronics unit 32 is powered by a power unit 33, which will be connected to the ships main 34. The output signal of the main electronics unit is fed through line 35 to a display unit 36, which may be an indicator, a recorder or other processing means (not shown). The indicator and/or recorder 36 should contain adequate dampening means which will later be discussed.

As shown already, correct alignment of the sensor is very important. FIG. 4 shows an example of a support, which allows adjustment of the plane, in which the rate-of-turn sensor will be finally positioned. FIG. 4 is a front view of the support, FIG. 5 is a view from the right side of FIG. 4 and FIG. 6 shows the bottom view of the support.

The rate-of-turn transducer (40) is fixed, e.g., by bolts 41 to the top plate 42 of the support 43 which further comprises the plates 44 and 45, the latter being adapted to be fixed to the structure of the ship, for which purpose three holes 46, 47 and 48 have been provided. The top plate 42 is hingeably attached to the plate 44 by means of two roller hinges 49 and 50, while adjustment of the tilt, e.g., two degrees at either side of the horizontal of this plate is possible through the adjustment screw 51, comprising a handwheel 52, one locking unit 53, as well as a stud 55. The plate 44 is also hingeably fixed, but to the plate 45 and by means of cone hinges, one of which is shown in cross-section in FIG. 7. The protruding ear 56 of plate 44 is hingeably fastened to the protruding ear 57 of plate 45 by means of a stud 58 with a conical end 59, which fits in a conical hole 60 in ear 57. The stud is provided with a nut 61, which is secured by a second nut 62. By means of the cone hinge it will be possible to eliminate all intolerable clearance.

The tilt (e.g., four degrees at either side of the horizontal) of plate 44 with respect to plate 45 can be adjusted by the adjusting screw 63, comprising as in the case of adjusting screw 51, a handwheel 64, one locking nut 65, as well as a stud 67.

This support makes it possible to adjust the tilt of the plane in which the rate-of-turn transducer is fixed along two hinge axes, which are parallel to the two main axes of the plane.

Figure 8:
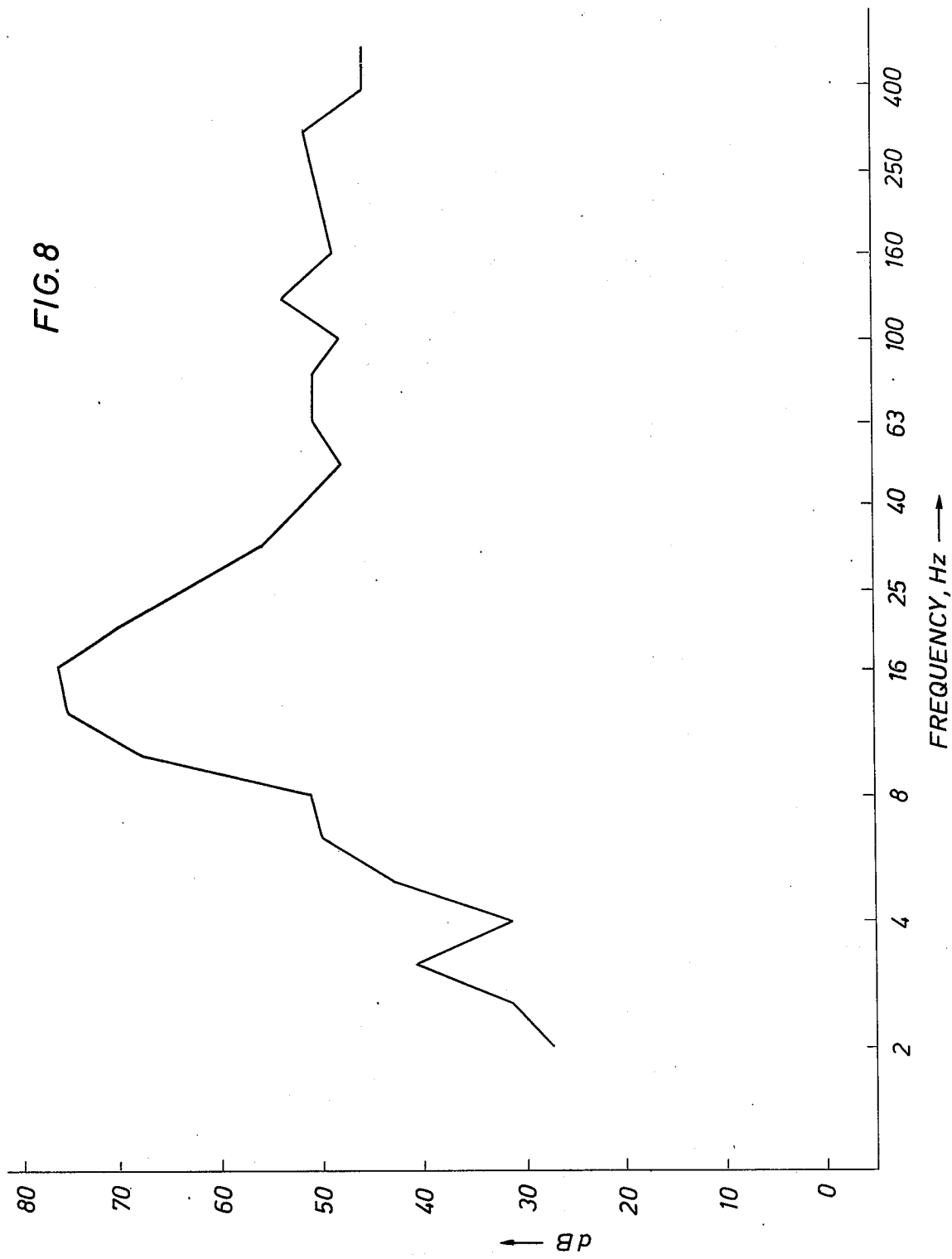
FIG. 8 shows a typical spectrum of linear vibrations as experienced in the wheelhouse of a ship.

FIG. 8 shows a typical spectrum of linear vibrations as experienced in the wheelhouse of a ship. The frequency has been plotted along the horizontal axis and the received signal in dB along the vertical axis. It is reasonable to assume that rotational vibrations occur over a similar band of frequencies. The amplitude or rotational vibrations, when expressed in terms of angle, are minute. In terms of rate-of-change of amgle (degrees per second) they are very large; to these a rate sensor is designed to respond.

As mentioned already, the majority of rate sensors respond implicitly to input signals within the frequency range zero to 60 Hertz. Fortuneately, in this application the effective frequency response is considerably reduced by the limited response of output display meters, of which the damped natural frequency seldom exceeds 1.0 Hertz. However, in view of the large magnitude of vibration induced rate signals to which a sensor will be subjected, additional damping is considered to be important.

The degree of system damping required to give optimum performance is impossible to predict with certainty. Factors such as the amplitude and frequency of the "noise" content of any signal significantly affect the degree of damping required. However, in the role for which a rate-of-turn meter is intended there is no advantage to be gained by displaying data which varies faster than correction can be applied.

Figure 9:
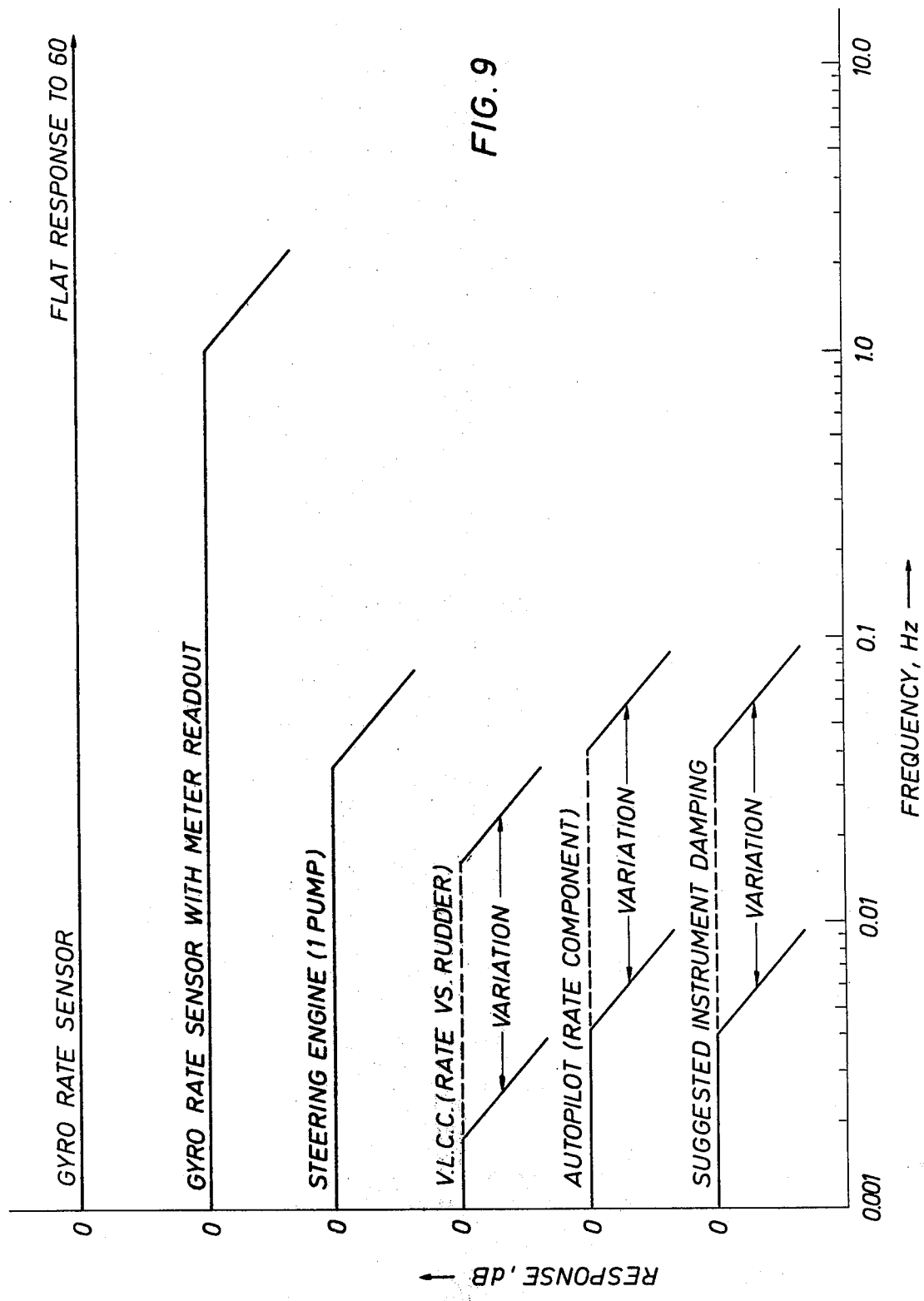
FIG. 9 shows a schematic frequency response of some apparatuses onboard ship, as well as of the ship.

Tests onboard ship established the schematic frequency response of a number of apparatuses (as well as of a ship) as is shown in FIG. 9, wherein the response has been plotted linearly in dB along the vertical axis and the frequency logarithmically along the horizontal axis.

The time constant of the steering engine appeared to be 4.4 seconds (1 pump operation).

The response of a ship to rudder movements may also be considered pertinent to the choice of damping. This may vary with ship and loading from 10 seconds to 100 seconds.

The characteristics of a V.L.C.C. autopilot may also serve as a useful guide to the choice of rate damping. (Rate detection is essential to the satisfactory operation of an autopilot). A survey has shown rate suppression, above certain frequencies, to be common to all. Suppression or "top-cut" frequency varies with the size of ship and loading from 0.04 Hertz to 0.004 Hertz (4 to 40 seconds time constant).

On the basis of the limited data available it is considered necessary to supplement the inherent damping of a rate-of-turn meter with electronic damping that may be varied from 0 second to 40 seconds time constant.

Figure 10:
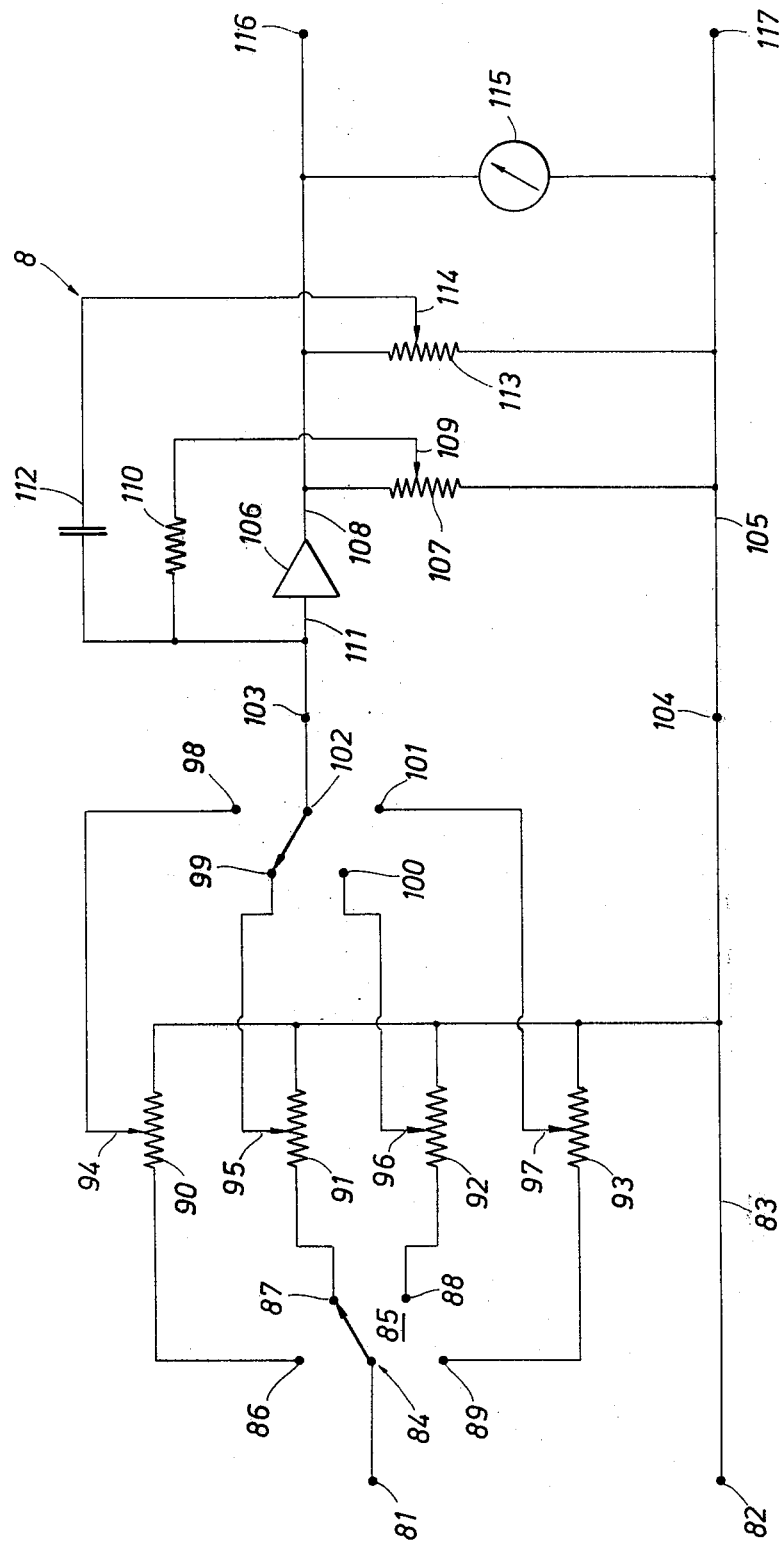
FIG. 10 is a circuit diagram of dampening means usable with a rate-of-turn indicator.

FIG. 10 shows a typical example of a damping circuit 80, which may be incorporated in the rate-of-turn indicator, as well as of a switching means for selecting between different full scale ranges.

The output signal of a rate-of-turn transducer is fed to the input between terminals 81 and 82, the latter being connected with a common conductor 83 for the circuit. Terminal 81 is connected to the common pole 84 of selector switch 85, having four terminals 86, 87, 88 and 89, of which one may be connected to the common pole 84, in the figure terminal 87 has been selected. These four terminals are connected to four potentiometers, respectively 90, 91, 92 and 93, each having a sliding contact 94, 95, 96 and 97 respectively, which are connected to the terminals 98, 99, 100 and 101 of the second half of switch 85. These latter terminals may be connected to the common pole 102, which is connected to the input 103 of the damping circuit 80. The other half of its input being connected at the one side to the common line 83 and at its other side to the common line 105 of the damping circuit. The two halves of switch 85 co-operate with each other in such a way that always one potentiometer is circuited between the terminals 81 and 103, which in the case depicted is potentiometer 95. The potentiometers are further connected to the common line 83.

Switch 85 can be used to select an accurately calibrated range, e.g., 90-0-90 degrees/minute (X 1), 30-0-30 degrees/minute (X 3), 9-0-9 degrees/minute (X 10), while a further position is provided, which allows the calibration to be infinitely variable between X 1 and X 10. These possibilities may be incorporated by respectively potentiometers 90, 91, 92 and 93.

The damping circuit 80 consists basically of an operational amplifier 106 with a fixed gain, which may be adjusted by means of a potentiometer 107 which is connected between the output 108 of the amplifier and the common line 105, while its sliding contact 109 is connected through the resistor 110 to the input 111 of the amplifier.

The operational amplifier is capable of being used as an integrator, the time constant of which is determined by the capacitor 112, the resistor 110 and the potentiometer 113, which is connected parallel to potentiometer 107, while its sliding contact 114 is connected with one side of the capacitor 112, the other side of which being connected to the input 111 of the amplifier 106.

In a typical example the resistor 110 and the capacitor 112 may be chosen so that a fixed time constant of 4 seconds is determined. The potentiometer 113 may then provide a factor of between 1 and 1/10 to the output signal of the amplifier and hence a time constant of in between 4 and 40 seconds can be achieved.

The resulting signal is displayed on an indicator 115 and may be fed to other display or processing means (not shown) via terminals 116 and 117.

Figure 11:
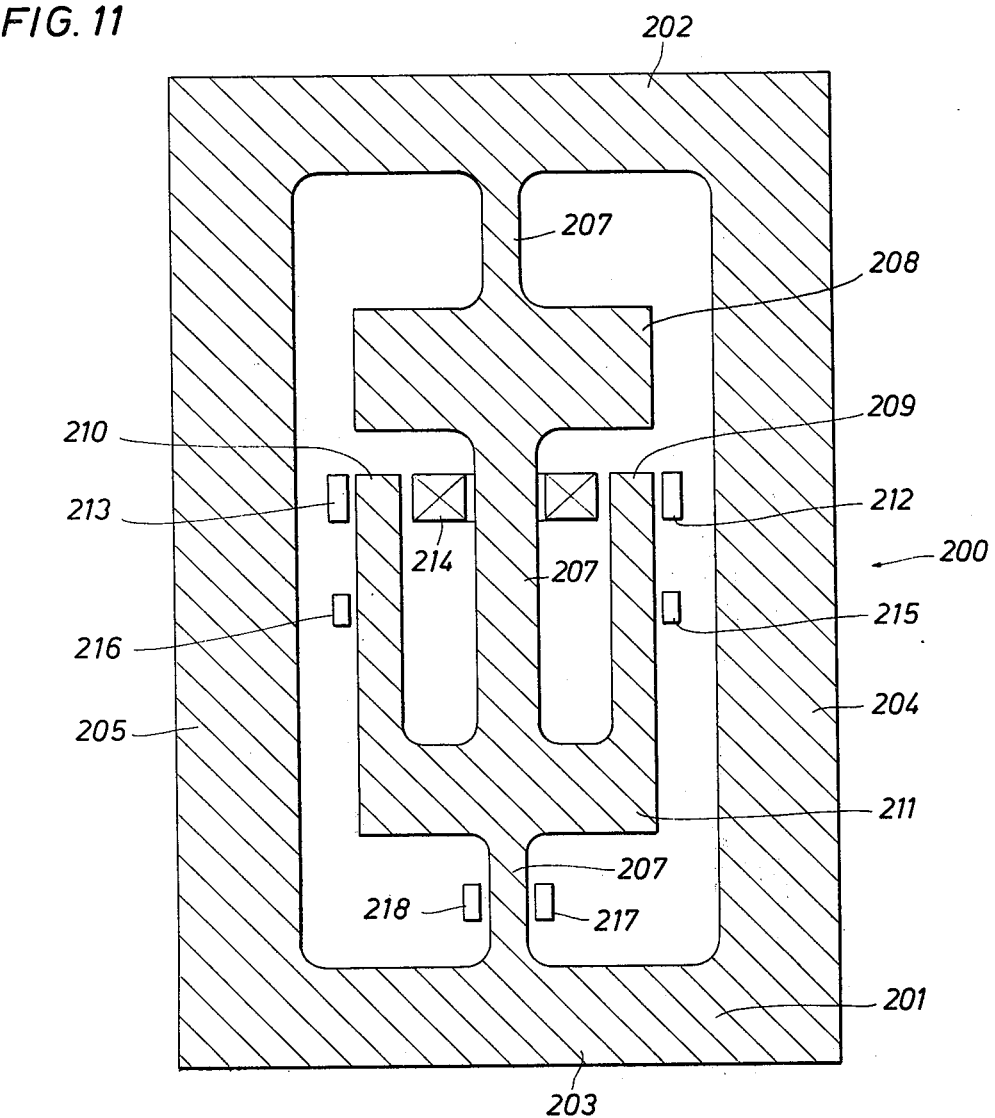
FIG. 11 is a view in elevation of a rate-of-turn transducer including a tuning fork.

FIG. 11 shows a cross-section of a preferred type of rate-of-turn sensor for spplication in the arrangement and the method according to the present invention.

The sensor 200 is made from a single piece of material and comprises a casing 201, end plates 202 and 203, side members 204 and 205, which may, for example, be 36 mm thick (i.e., in a plane perpendicular to the plane of FIG. 11), a tuning fork 206, a stem 207 and a balancing member 208. The stem extends perpendicularly from the end plate 202 to the end plate 203, while its longitudinal axis is symmetrically placed with respect to the two members 204 and 205. The tines 209 and 210 of the tuning fork 206 extend from a cross member 211.

The tuning fork 206 is driven electronically by an arrangement comprising two outer electrodes 212 and 213 and a single inner electrode structure 214 which surrounds the stem 207. A pair of electromagnetic pick-offs 215 and 216 are positioned beside each of the tines so that an oscillatory E.M.F. is generated in them on vibration of the tines. These pick-offs are connected in series (not shown) and coupled to the input of an amplifier (not shown) which generates a voltage at its output which is fed to the electrodes 212, 213 and 214. The fork is thus driven at a frequency equal to the natural frequency of vibration of the fork.

If the thus driven tuning fork 206 is mounted with the axis of its stem parallel to the Y-axis of a ship (see FIG. 2) and is then rotated about that axis, a torsional oscillation will be set up in the stem 207 with an amplitude which depends on the rate of rotation. A pair of pick-offs 217 and 218 are provided to detect the magnitude and phase of these oscillations, which quantities represent the rate and sense of the rotation of the fork 206, and which may be directly or indirectly displayed.

I claim as my invention:

1. An apparatus for measuring the rate-of-turn of a ship comprising:

a rate-of-turn sensor, said sensor being mounted in a fixed position relative to the ship's structure with its response axis parallel to the vertical axis of the ship and generating a signal representative of the rate-of-turn of the ship, a rate-of-turn display, said display including means for calibrating the display as a 30°/minute full scale range instrument; and means for feeding the signal from the sensor to the display.

2. The apparatus according to claim 1 in which the display includes means for adjusting the full scale range to rates-of-turn of the ship of 9°/min.

3. The apparatus of claim 1 and in addition a support for the rate-of-turn sensor, said support being adapted to be fixedly attached to the ship and having adjustment means for the plane of the rate-of-turn sensor.

4. The apparatus of claim 3, wherein the plane of said sensor can be tilted relative to two axes which are perpendicular to each other.

5. The apparatus of claim 4, wherein said support comprises three vertically spaced apart plates, the lowest plate having means for attaching it to the structure of the ship; the middle plate being attached to the lowest plate by means of a hinge having a horizontal first hinge axis and provided with an adjustment device so as to allow adjustment of the middle plate about the first hinge axis; the top plate being attached to the middle plate by means of a hinge having a horizontal second hinge axis, which is perpendicular to said first hinge axis and provided with an adjustment device so as to allow adjustment of the top plate about the said second hinge axis, said top plate being adapted for attaching a rate-of-turn sensor thereto.

6. The apparatus of claim 5, wherein said hinge between the middle and the lowest plate is a cone hinge provided with adjustment means for eliminating substantially all clearance.

7. The apparatus of claim 1 and in addition a signal dampening means with an adjustable time constant.

8. The apparatus of claim 7, wherein the time constant may be varied from 0 second to 40 seconds.

9. The apparatus of claim 1, wherein the rate-of-turn sensor comprises a tuning fork together with means for maintaining the fork in vibration and means for detecting and measuring torsional oscillations set up in the stem of the fork, which oscillations are a measure for the rate-of-turn of the ship.

* * * * *